March 4, 1958 — W. H. BOWES — 2,825,829
INDUCTION CLUTCH
Filed Oct. 2, 1956 — 4 Sheets-Sheet 1

INVENTOR
WILLIAM H. BOWES
By Smart + Biggar
ATTORNEYS

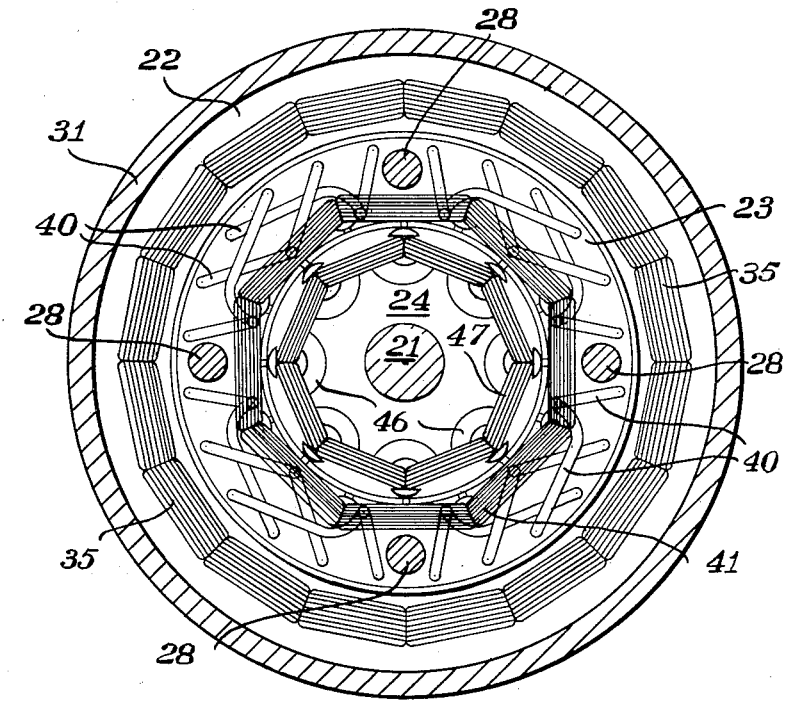
FIG. 3.
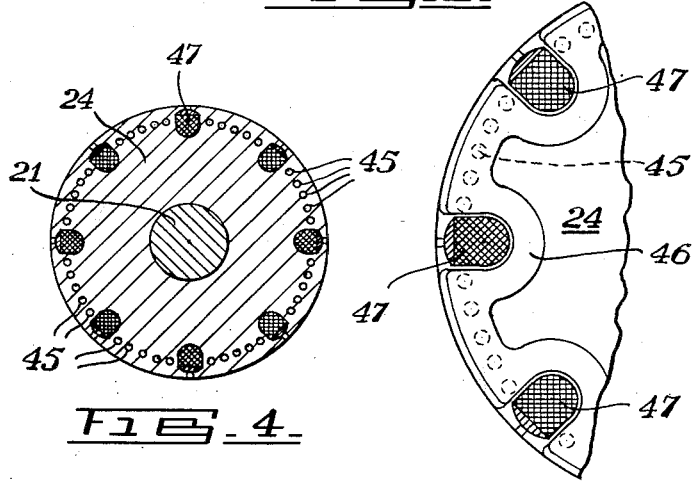
FIG. 4.
FIG. 5.

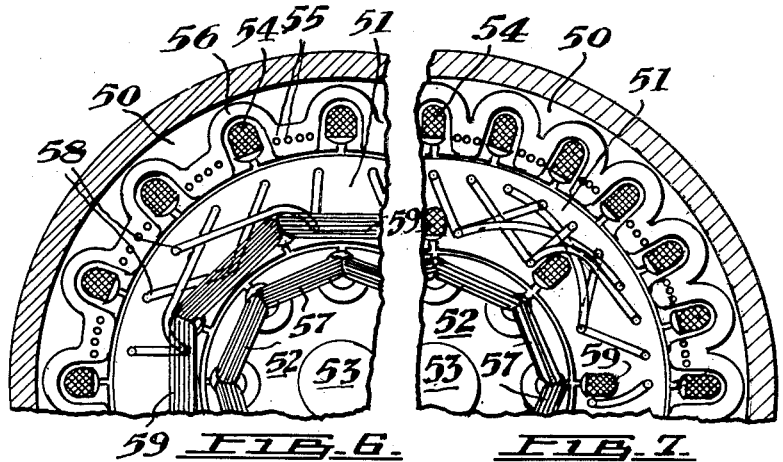
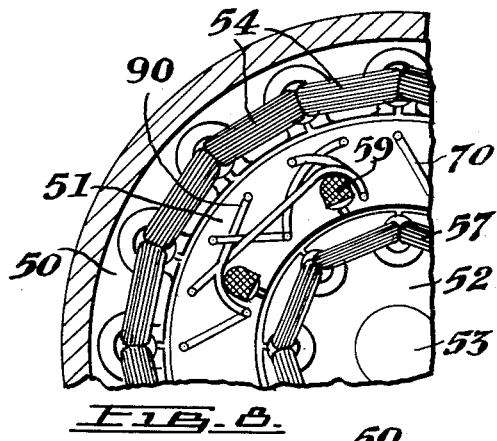
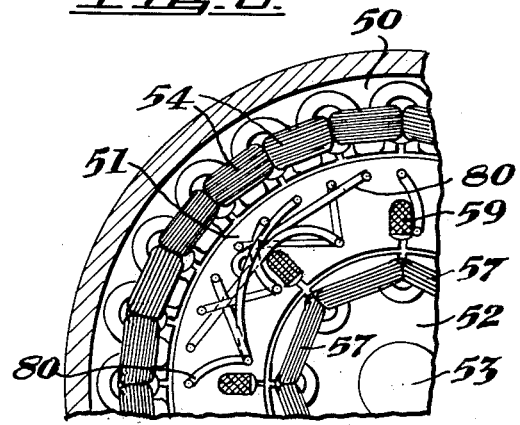

March 4, 1958 W. H. BOWES 2,825,829
INDUCTION CLUTCH

Filed Oct. 2, 1956 4 Sheets-Sheet 4

INVENTOR
WILLIAM H. BOWES
BY Smart & Biggar
ATTORNEYS.

United States Patent Office 2,825,829
Patented Mar. 4, 1958

2,825,829
INDUCTION CLUTCH

William H. Bowes, Peterborough, Ontario, Canada, assignor to Canadian Patents and Development Limited, Ottawa, Ontario, Canada, a company Application October 2, 1956, Serial No. 613,450

18 Claims. (Cl. 310—102)

The invention relates to an induction clutch of particular advantage in marine use but which is also useful for such purposes as rolling mill drives, locomotive drives, or in an automobile transmission. An important feature of the invention is that the induction clutch can be designed so that the drive through the clutch is reversible.

Prior to the present invention a satisfactory clutch and reversing mechanism has not been available as a single unit for use in large ships. The mechanisms presently used for coupling between the source power and the propeller of the ship depend upon the type of source of power which is usually one of three kinds—steam turbine, turbine-electric, or diesel engine.

The steam turbine is a high speed source of power and in the past has had a fixed coupling through suitable reduction gears to the low speed propeller shaft. Reversing of the propeller shaft has been accomplished by shutting off the steam supply to the turbine and diverting the steam to a second smaller turbine which turns in an opposite direction. This arrangement has the serious disadvantage that two turbines are necessary and the reversal of direction of the propellers requires considerable time so that the maneuverability of the ship suffers. The smaller turbine used for reverse operation of the ship lowers the efficiency of the installation because it turns when the ship is being powered by the main turbines. The friction and windage drag of the small turbine constitutes a power loss and this loss is present whenever the ship is in the ahead direction.

In the turbine-electric system a single turbine is usually arranged to drive a generator of electricity thereby converting the mechanical energy into electrical energy which is then supplied to a motor. The speed and direction of the motor, and hence the propeller shaft may then be controlled electrically, but the system has the disadvantage that in order to obtain a high efficiency an expensive installation is required.

In the case of a diesel engine installation, usually a fixed coupling is used through suitable reduction gears to the propeller shaft. In this arrangement reversal of direction is accomplished by bringing the engine to a full stop and re-starting it in the opposite direction. Considerable costly mechanism is required for the sole purpose of making the engine reversible.

The present invention provides an induction clutch which is a single unit, and, if designed in accordance with the invention to be reversible, of which the efficiency in the ahead direction does not suffer to any substantial extent because of its ability to reverse. According to the invention, an induction clutch for transmitting rotative power between two shafts comprises a cylindrical shaped stator, a first cylindrical shaped rotor coaxially arranged with respect to the stator and fixed to one of the shafts to rotate therewith, a second cylindrical shaped rotor coaxially arranged with respect to the stator and fixed to the other of the shafts to rotate therewith, the second rotor being between the stator and the first rotor, the surface of the second rotor next the first rotor being fitted with windings for direct current adapted to establish a predetermined number of alternate north and south magnetic poles, the surface of the first rotor next the second rotor being fitted with a squirrel cage winding, each of the surfaces of the second rotor next the stator and next the first rotor being fitted with spaced apart parallel conductors, the number of said conductors in the surface of the second rotor next the stator being N times the number of said conductors in the surface of the second rotor next the first rotor, where N is a whole number, the surface of the stator next the second rotor being fitted with windings for direct current adapted to establish N times as many alternate north and south magnetic poles as on the surface of the second rotor next the first rotor, the conductors in the surface of the second rotor next the stator being directly connected together at one end of the second rotor and said conductors in the surface of the second rotor next the first rotor being directly connected together at the same end of the second rotor while at the other end of the second rotor N conductors of like phase in the surface next the stator are connected to each of the conductors in the surface next the first rotor.

An induction clutch according to the present invention has the inherent advantages of electromagnetic coupling between the power unit and the propeller shaft and is relatively simple and inexpensive. The power unit may be started, tested, and warmed up while the ship is docked, which could not be done with geared turbine or geared diesel engines. The efficiency in the ahead direction is high, the only loss being that required for excitation of the windings. It is satisfactory to have a lower efficiency for operation in the astern direction, permitting an inexpensive design for converting mechanical energy into electrical energy and electrical energy back to mechanical energy for running the propeller shaft in the reverse direction. If desired, the clutch can be designed for different ratios of reverse speed to forward speed. A clutch according to the invention can be adapted for use in an automobile transmission because it can be designed to reduce speed while increasing torque and to couple and uncouple smoothly.

The invention will be further described with reference to the accompanying drawings, in which:

Figure 3 is an end view partly in section taken on the line 3—3 of Figure 1;

Figure 4 is a cross sectional view of the central rotor of the clutch shown in Figure 1, taken on the line 4—4;

Figure 5 is an enlarged end view showing part of the shorting ring on the central rotor of the clutch shown in Figures 1, 2 and 3;

Figures 6, 7, 8 and 9 are partial end views showing alternative arrangements of the wiring of the clutch shown in Figures 1, 2 and 3;

Figure 1:
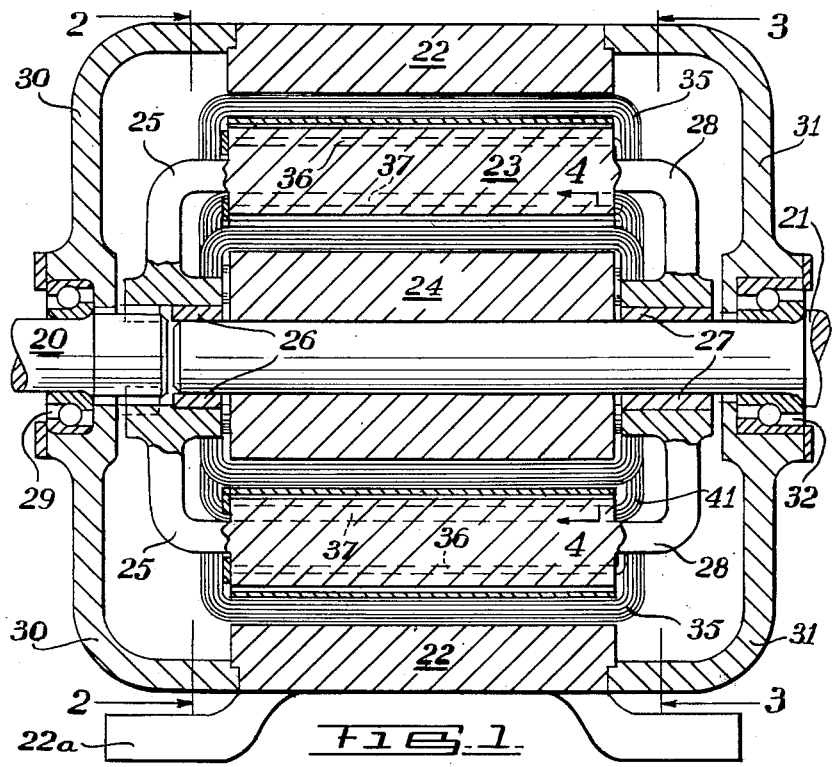
Figure 1 is a cross sectional side view of a reversible induction clutch in accordance with the invention.
Figure 2:
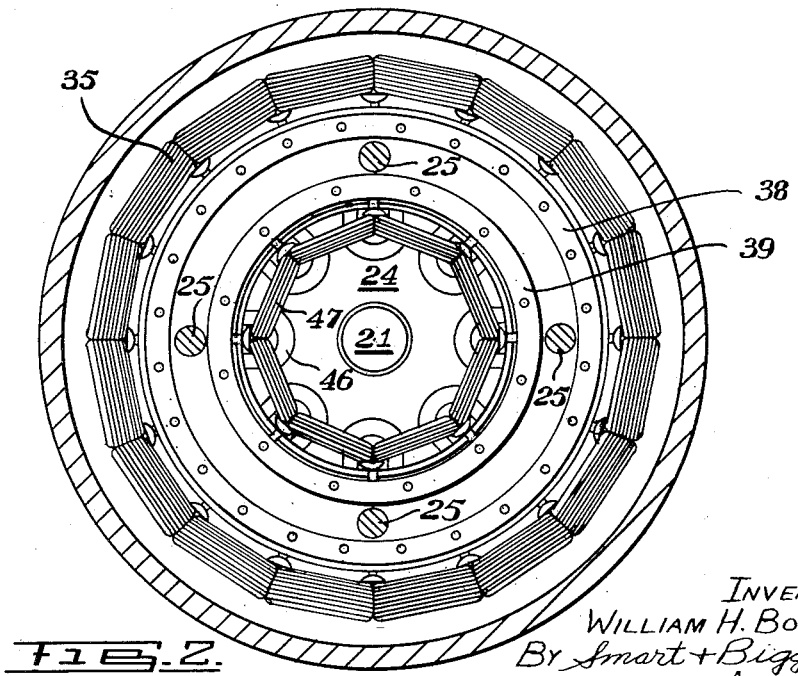
Figure 2 is an end view partly in section taken on the line 2—2 of Figure 1.

As shown in Figures 1, 2 and 3, the reversible induction clutch comprises three concentric parts arranged between two aligned power transmission shafts 20 and 21. The three concentric parts are an outer cylindrical shaped stator 22, a cylindrical shaped rotor 23 arranged coaxially with respect to the stator 22, and a cylindrical shaped rotor 24 arranged coaxial with respect to the stator 22 and the rotor 23. The rotor 23 is fixed by arms 25 to the shaft 20 to rotate therewith and is fitted with bearings 26 and 27 about the shaft 21. Arms 28 are provided between the rotor 23 and the bearing 27. The shaft 20 is arranged for rotation with respect to the stator 22 by passing through a ball bearing 29 fixed to the left hand end of the stator 22 by arms 30. The rotor 24 is fixed to the shaft 21. The clutch is supported on a base 22a to which the stator 22 is fastened. The right hand end of the stator 22 is connected by arms 31 to a ball bearing 32 through which the shaft 21 passes. This arrangement permits rotation of the rotors 23 and 24 relative to one another and rotation of both rotors 23 and 24 relative to the stator 22. The shaft 20 is driven by the engine, while the shaft 21 connects to the propeller in the case of the clutch being used for ship propulsion.

In general, the design of the various components of the reversible induction clutch is according to the same principles as the design of the components of conventional electric motors and generators. The rotors 23 and 24 should be constructed from laminated high-permeability steel, while the stator 22 can be constructed from either laminated or solid high-permeability steel, the choice being mainly a question of economy although laminated construction of the stator 22, would give better operating characteristics.

As shown in Figures 1, 2 and 3, the inner surface of the stator 22 is fitted with multiple turn coils 35 of insulated wire for carrying direct current. Connections (not shown) are provided for supplying direct current to the windings 35 so that the direction of current flow in the windings 35 will poduce alternate north and south poles on the inner surface of the stator 22. Thus, the design of the stator 22 is substantially the same as that of the stator for a fixed field generator.

Insulated low resistance bars 36 are set into slots in the outer surface of the rotor 23 so that they are parallel to the axis of rotation. Another set of insulated low resistance bars 37 are set into slots in the inner surface of the rotor 23 and are also parallel to the axis of rotation. In the clutch shown in Figures 1, 2 and 3 there are twice as many bars 36 in the outer surface as there are bars 37 in the inner surface of the rotor 23. As shown in Figure 2, the ends of all the bars 36 at one end of the rotor 23 are direct-connected together by a low-resistance shorting ring 38. A similar shorting ring 39 connects together the ends of the bars 37. As shown in Figure 3, interconnecting low-resistance conductors 40 are provided across the end of the rotor 23 opposite to the end shown in Figure 2. The inter-connecting conductors 40 connect pairs of bars of like phase in the outer surface of the rotor 23 to single bars in the inner surface of the rotor 23.

The inner surface of the rotor 23 is fitted with insulated, multiple-turn field coils 41, as shown in Figures 1 and 3. The coils 41 are placed in slots in the inner surface of the rotor 23 and connections (not shown) are provided to supply direct current to the coils 41 to produce alternate north and south poles on the inner surface of the rotor 23. The number of poles produced on the inner surface of the rotor 23 is one-half of the number of poles produced on the inner surface of the stator 22. The design of these coils is similar to that of the field coils of a generator. Slip rings (not shown) of conventional design must be provided for conducting the direct current to the field coils of the rotor 23.

As shown in Figures 4 and 5, insulated conductor bars 45 are placed in slots in the outer surface of the rotor 24 and are interconnected by short circuit rings 46 at both ends, one of the short circuit rings 46 being shown in Figure 5. Insulated multiple-turn field coils 47 are placed in slots in the outer surface of the rotor 24. Connections (not shown) are provided to connect the field coils 47 to a direct current source so that the direction of current flow will produce alternate north and south poles on the outer surface of the rotor 24. The number of poles produced on the outer surface of the rotor 24 is the same as the number of poles produced on the inner surface of the rotor 23. Slip rings (not shown) of conventional design must be provided for conducting the direct current to the field coils 47 of the rotor 24. The design of the conductor bars 45 and their shorting rings 46, which form a squirrel cage, and of the field coils 47 is similar to the design of corresponding parts for a synchronous motor.

In operation the shaft 20 (Figure 1) connects to a source of power while the shaft 21 connects to the part to be driven, for example, the propeller shaft of a ship. Rotation of the shaft 20 rotates the rotor 23 which is fixed to the shaft 20 but which is arranged to rotate relatively to the shaft 21 by provision of the bearings 26 and 27. Assuming that the rotor 23 is rotated in a clockwise direction (Figure 3) it will be seen that the rotor 24 can be made to rotate clockwise or anti-clockwise, or remain stationary. Accordingly, the clutch, when used to transmit power to the propeller shaft of a ship achieves the important function of developing substantially full torque ahead or astern, or no torque at all.

With the rotor 23 rotated in a clockwise direction by the shaft 20 the windings which are used for forward drive are the field windings 41 on the inner surface of the rotor 23, and the field windings 47 which are in the outer surface of the rotor 24. Each of these coils is excited by direct current so that an eight-pole magnet is formed around the inner surface of the rotor 23 and around the outer surface of the rotor 24. Accordingly, the rotor 24 will follow the rotor 23 in synchronism. The squirrel cage formed by the bars 45 (Figures 4 and 5) in the outer surface of the rotor 24 serves to start the rotor 24 and to bring it into almost synchronous speed with the rotor 23, in the same way as is done in conventional synchronous motors.

In the embodiment of the invention just described the rotor 24 has eight poles, the rotor 23 has eight poles on the inside and sixteen poles on the outside, and the stator 22 has sixteen poles. This sequence 8, 8, 16 and 16 can be altered providing the relationship $2n$, $2n$, $4n$ and $4n$ is maintained. Practical design considerations would determine the value of the integer $n$.

For operation of the shaft 21 in the reverse direction to that of the shaft 20 the windings 35 in the inner surfaces of the stator 22 are excited by direct current producing eight north and eight south poles on the inner surface of the stator 22. Assuming that the rotor 23 is being driven by the shaft 20 at 500 R. P. M. in the clockwise direction, the conductors 36 in the outer surface of the rotor 23 will have an alternating voltage of 4,000 cycles per minute generated in them and will produce alternating current of 4,000 cycles per minute frequency. The conductors 40 (Figure 3) across the end of the rotor 23 carry this 4,000 per minute current to the conductors 37 on the inner surface of the rotor 23. Thus the stator 22 and the outer portion of the rotor 23 function as a 16-pole 3-phase generator. The conductors 37 on the inner surface of the rotor 23 are essentially the windings of an 8-pole 3-phase motor, the number of poles on the inner surface of a rotor 23 being one-half the number of the outer surface because of the 2 to 1 interconnection across the end of the rotor 23 by the conductors 40.

The 3-phase current at 4,000 cycles per minute in the conductors 37 in the inner surface of the rotor 23 excite a field of 4 north and 4 south poles which rotates relative to the rotor 23 at 1,000 R. P. M. in a counterclockwise direction. Because the rotor 23 rotates at 500 R. P. M. clockwise, the field of an inner surface of the rotor 23 rotates relative to a fixed object at 500 R. P. M. counterclockwise. This 500 R. P. M. counterclockwise rotating field will induce current in the squirrel cage conductors 45 (Figures 4 and 5) of the rotor 24 causing the rotor 24 to accelerate counterclockwise until a speed slightly less than 500 R. P. M. is attained. If desired, the coils 47 of the rotor 24 may be excited by direct current producing poles on the outer surface of the rotor 24 which will lock with the rotating field on the inner surface of the rotor 23 and drive the rotor 24 and its shaft 21 at 500 R. P. M. counterclockwise. Accordingly it can be seen that, with the rotor 23 driven by the shaft 20 at any given speed, exciting field coils of the stator 22 will cause the rotor 24 and its shaft 21 to rotate in the direction opposite to that in which the shaft 20 is driven. The rotor 24 and its shaft 21 may be operated at a speed slightly less than that of the shaft 20 and the rotor 23 when the coils 47 of the rotor 24 are not excited, or the shaft 21 may be driven at the same speed as the shaft 20 by exciting the field coils 47 of the rotor 24. It is to be noted that field coils in the rotor 24 are essential only in applications requiring synchronous speed. Where this is not required the cost of the machine may be reduced by eliminating the field coils from the rotor 24.

In the embodiment of the reversible induction clutch shown in Figures 1 to 5, three conductors in the outer and inner surfaces of the rotor 23, have been used for each pair of poles so that the machine contains the elements of a 3-phase generator and a 3-phase motor. The choice of three phases is an arbitrary one and not an essential feature of the machine. Another number of phases may be used, the optimum number being indicated by practical design considerations. The design of the individual components of the reversible induction clutch can be carried out by those skilled in the art of designing generators and motors. The designer would decide the number of poles in the stator, the number of phases, the thickness of the rotor 23 having regard for the adverse effect of that magnetic flux on the outer surface might have on the flux on the inner surface. The clutch might be designed with the rotor 24 placed outside and the stator 22 placed inside of the rotor 23.

An alternative design of the reversible induction clutch is illustrated by Figure 6. The general structure of this alternative is the same as that shown in Figures 1 to 5, so that only variations in the design will be discussed below.

Figure 6 shows a sector of an end view such as that shown in Figure 3. The outer part is a stator 50 surrounding concentric rotors 51 and 52. The rotor 52 is fixed to a shaft 53. The rotor 52 is driven by the shaft 53 from the power unit and turns it in one direction only. The rotor 51 is connected to the driven shaft, which is to be driven in either direction. The rotors 51 and 52 are of the same construction as the rotors 23 and 24 shown in Figures 1, 2 and 3. The stator 50 has field windings 54 which correspond to the field windings 35 of the stator 22 shown in Figures 1, 2 and 3. In addition, the stator 50 has a set of bars 55 which are short circuited by rings 56 at each end of the stator 50, forming a squirrel cage similar to that used in induction motors.

In operation the rotor 51 can be driven in either direction. To start the rotor 51 turning in a direction opposite to that of the rotor 52 the field windings 57 in the rotor 52 are excited to produce 8 poles, 4 north and 4 south on the outer surface of the rotor 52. As before, it is assumed that the rotor 52 is being rotated at 500 R. P. M. clockwise. While the rotor 51 is at rest all the conductors on its inner surface will be cut by the rotating field of the rotor 52 and will have alternating voltage of 4×500=2,000 cycles per minute generated in them, and will produce alternating current of 2,000 cycles per minute. The conductors 58 across the end of the rotor 51 carry the 3-phase, 2,000 cycles current to the conductors in the outer surface of the rotor 51 and this current will excite on the outer surface of the rotor 51, 8 north and 8 south poles which will rotate at 2,000/8=250 R. P. M. clockwise. The flux of these poles cuts the squirrel cage bars 55 of the stator 50 and because of the induced current in the bars 55 a force is exerted by the field on the stator 50 tending to turn it in a clockwise direction. However, the stator 50 is fixed and cannot rotate so that the stator 50 produces a reaction in a counterclockwise direction acting on the rotor 51 to accelerate it in a counterclockwise direction. As soon as the rotor 51 is in motion the frequency of the current is no longer 2,000 cycles per minute. For example, if the rotor 51 turns at 100 R. P. M. counterclockwise the relative speed of the rotor 51 to the rotor 52 is 100+500=600 R. P. M. Hence, the frequency of current in the rotor 51 is 600×4=2,400 cycles per minute. The field on the outer surface of the rotor 51 will then rotate relative to the rotor 51 at 2,400/8=300 R. P. M., which is a rotation relative to the stator 50 of 300−100=200 R. P. M.

As the speed of the rotor 51 increases, the speed of the field cutting the bars 55 of the stator 50 decreases and would be stationary if the rotor 51 could turn at 500 R. P. M. However, the rotor 51 cannot attain this speed by induction but can approach it, and when the rotor 51 is turning at slightly less than 500 R. P. M. the field coils 54 of the stator 50 may be energized thereby synchronizing the speeds of the rotors 51 and 52. Under these conditions the rotor 52 turns clockwise at 500 R. P. M. and causes the rotor 51 to rotate counterclockwise at 500 R. P. M.

The rotor 51 can be caused to rotate in the same direction as the rotor 52 by energizing the field coils 59 of the rotor 51. The bars of the squirrel cage of the rotor 52 then have current induced in them which will force the rotor 51 to turn in the same direction as the rotor 52. When the speed of the rotor 51 becomes slightly less than that of the rotor 52 the field coils 57 in the rotor 52 may be energized to synchronize the rotors 51 and 52.

The alternative design shown in Figure 7 is the same as that shown in Figure 6 except that there are three times as many bars in the outer surface of the rotor 51 as in the inner surface of this rotor and, in the case of the stator 50, the number of field coils 54 is changed to produce three times as many poles as there are on the outer surface of the rotor 52. The operation of this clutch design can be understood by following the same reasoning as described above in connection with operation of the construction shown in Figure 6. The rotor 51 may be caused to rotate at the same speed and in the same direction as the rotor 52 or in the reverse direction at one-half the speed of the rotor 52.

Other alternatives are possible with M times as many bars in the outer surface of the rotor 51 as in the inner surface, and M times as many bars on the stator 50 as on the rotor 52. With the rotor 52 rotating in one direction, the rotor 51 may be caused to rotate at the same speed in the same direction or in the reverse direction at $$\frac{1}{M-1}$$

times the speed of the rotor 52. It is to be noted that field coils in the stator 50 are essential only in applications requiring synchronous speed for the reverse direction. Where this is not required the cost of the machine may be reduced by eliminating the field coils from the stator 50.

A variable speed non-reversing clutch is shown in Figure 8 in which all parts are the same as those shown in Figure 6 except that the connections 70 across the end of the rotor 51 are crossed with respect to the end connections 58 of Figure 6. As before, the rotor 52 is connected by a shaft 53 to the power unit so that it is turned in one direction only. The rotor 51 is connected to the shaft which is required to be at rest, turned at the same speed as the rotor 52, or turned at a reduced speed and with increased torque.

In the construction shown in Figure 8, when the field coils 57 of the rotor 52 are excited, the rotor 51 will turn in the same direction as the rotor 52 but at a speed which approaches one-third of the speed of the rotor 52. Assuming the rotor 52 rotates at 500 R. P. M. clockwise and the rotor 51 is stationary, then the flux of the four north and four south poles on the rotor 52 cutting the conductors in the inner surface of the rotor 51, will generate in the conductors alternating current at a frequency of 4×500=2,000 cycles per minute. The current carried across the end of the rotor 51 to conductors in the outside surface of the rotor 51 will excite 8 north and 8 south poles rotating at 2,000/8=250 R. P. M. As the end connections 70 are crossed with respect to those of Figure 6, the sequence is reversed and the field rotation is counterclockwise. This rotating field will induce current in the squirrel cage of the stator 50 and hence exert a counterclockwise turning effort on the stator 50. Because the stator 50 is fixed and cannot rotate the reaction of this turning force on the stator 50 is a clockwise turning force acting on the rotor 51 which will give the rotor 51 a clockwise acceleration. When the rotor 51 is in motion the frequency is no longer 2,000 cycles per minute. For example, if the rotor 51 turns at 100 R. P. M. clockwise the speed of the rotor 52 relative to the rotor 51 is 500−100=400 R. P. M. The frequency of the current is then 4×400=1600 cycles per minute. The field on the outside of the rotor 51 rotates relative to the rotor 51 at 1600/8=200 R. P. M. counterclockwise. This field rotates at 200−100=100 R. P. M. counterclockwise relative to the stator 50. As the speed of the rotor 51 increases, the speed of the field cutting the squirrel cage bars in the stator 50 decreases and would be stationary if the rotor 51 could turn at 166⅔ R. P. M. However, the rotor 51 cannot attain this speed by induction but can approach it, and when the rotor 51 is turning at slightly less than 166⅔ R. P. M. the field coils in the stator 50 may be energized thus synchronizing the rotors 51 and 52. Under these conditions the rotor 52 turns clockwise at 500 R. P. M. and the rotor 51 turns clockwise at 166⅔ R. P. M. To cause the rotor 51 to turn at the same speed and in the same direction as the rotor 52 the field coils of the rotor 51 are energized. By induction the rotor 51 will turn at slightly less than the speed of the rotor 52 and may be synchronized by exciting field coils in the rotor 52.

Another design of a variable speed clutch is illustrated in Figure 9 and the parts shown are the same as those shown in Figure 7 except for the rotor 51 which has different cross connections 80 as shown in Figure 9. The reasoning behind the operation of the variable speed clutch shown in Figure 9 is similar to that described above in connection with the variable speed clutch shown in Figure 8. The rotor 51 of the clutch shown in Figure 9 may be made to rotate in the same direction as the rotor 52 and at the same speed or at one-fourth of the speed of the rotor 52.

Other variable speed clutches similar in principle to those described in connection with Figures 8 and 9 may be designed. With M times as many bars in the outer surface of the rotor 51 as in the inner surface and M times as many poles on the stator 50 as on the rotor 52, the rotor 51 may be caused to rotate in the same direction as the rotor 52 at the same speed or at $$\frac{1}{M+1}$$

of the speed of the rotor 52.

Figure 11:
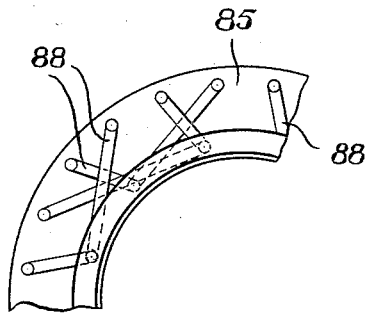
Figure 11 is a partial end view taken from the left hand end of the clutch shown in Figure 10.
Figure 10:
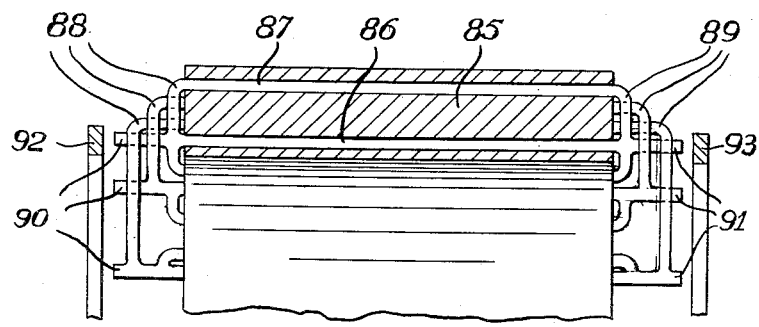
Figure 10 is a side view partly in section of a reversible clutch in accordance with the invention arranged to provide variable speed.
Figure 12:
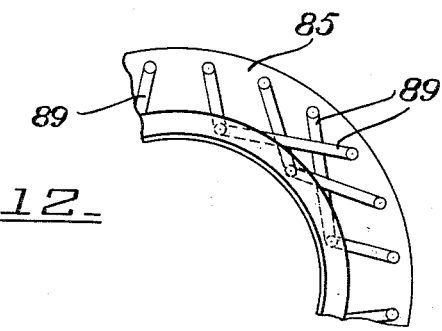
Figure 12 is a partial end view taken from the right hand end of the clutch shown in Figure 10.

A construction of a variable-speed reversible clutch is illustrated by Figures 10, 11 and 12. The various components are the same as in Figure 8 and for the sake of clarity in Figures 10, 11 and 12, only the rotor 85 which runs between the stator and the central rotor is shown, and the field windings are omitted. The rotor 85 has an inner and an outer set of conductors 86 and 87 which are interconnected at each end of the rotor 85 by interconnections 88 and 89. Each interconnection 88 or 89 has a projecting contact 90 or 91. Two short-circuit rings 92 and 93, one at each end of the rotor 85, are arranged by any convenient means (not shown) so that they may be moved parallel to the axis of the rotor 85 into and out of contact with the contacts 90 and 91.

In operation, when the ring 92 is moved to short-circuit the contacts 90, the cross-connections 88 on that end of the rotor 85 are short-circuited and cross-connections 89 are effective, and the clutch operates in the same way as that shown in Figure 6. When the ring 92 is moved away from the contacts 90, and the ring 93 is moved to short-circuit the contacts 91, the cross-connections 89 are short-circuited and cross-connections 88 are effective, and the clutch operates in the same way as that shown in Figure 8. Accordingly, the rotor 85 may be (1) coupled directly to the central rotor 52 (see Figures 6 and 8), (2) driven in the same direction as the rotor 52 at one-third of the speed of the rotor 52, or (3) driven in the reverse direction at full speed.

An alternative construction would be to have one end of the rotor 85 cross connected as in Figure 7 and the other end as in Figure 9 with contacts and movable rings as in Figure 10. Then the rotor 85 may be (1) coupled direct to the rotor 52 (see Figures 7 and 9), (2) driven in the same direction as the rotor 52 at one-quarter the speed, or (3) driven in the reverse direction at one-half speed.

Other variable-speed reversible clutches may be designed. The end cross-connections and the movable rings would be as shown in Figures 10, 11 and 12, but with M times as many conductors in the outer surface as in the inner surface of the rotor 85, and also M times as many poles in the stator 50 (Figures 6 and 8) as in the rotor 52. Then, the rotor 85 may be (1) coupled direct to the rotor 52, (2) driven in the same direction as the rotor 52 at $$\frac{1}{M+1}$$

of the speed of the rotor 52, or (3) driven in the reverse direction at $$\frac{1}{M-1}$$

of the speed of the rotor 52.

What I claim as my invention is:

1. An induction clutch for transmitting rotative power between two shafts comprising, a cylindrical shaped stator, a first cylindrical shaped rotor coaxially arranged with respect to the stator and fixed to one of said shafts to rotate therewith, a second cylindrical shaped rotor coaxially arranged with respect to the stator and fixed to the other of said shafts to rotate therewith, the second rotor being between the stator and the first rotor, the surface of the second rotor next the first rotor being fitted with windings for direct current adapted to establish a predetermined number of alternate north and south magnetic poles, the surface of the first rotor next the second rotor being fitted with a squirrel cage winding, each of the surfaces of the second rotor next the stator and next the first rotor being fitted with spaced apart parallel conductors, the number of said conductors in the surface of the second rotor next the stator being N times the number of said conductors in the surface of the second rotor next the first rotor, where N is a whole number, the surface of the stator next the second rotor being fitted with windings for direct current adapted to establish N times as many alternate north and south magnetic poles as on the surface of the second rotor next the first rotor, said conductors in the surface of the second rotor next the stator being direct connected together at one end of the second rotor and said conductors in the surface of the second rotor next the first rotor being direct connected together at the same end of the second rotor while at the other end of the second rotor N conductors of like phase in the surface next the stator are connected to each of the conductors in the surface next the first rotor.

2. An induction clutch as defined in claim 1 in which the spaced apart parallel conductors in each of the surfaces of the second rotor are uniformly spaced apart and are fixed parallel to the axis of rotation of the second rotor.

3. An induction clutch as defined in claim 2 in which the surface of the first rotor next the second rotor is fitted with windings for direct current adapted to establish a predetermined number of alternate north and south poles.

4. An induction clutch as defined in claim 3 in which the whole number N is two.

5. An induction clutch as defined in claim 1 in which the surface of the first rotor next the second rotor is fitted with windings for direct current adapted to establish a predetermined number of alternate north and south poles.

6. An induction clutch as defined in claim 5 in which the whole number N is two.

7. An induction clutch as defined in claim 1 comprising, a squirrel cage winding fitted into the surface of the stator next the second rotor.

8. An induction clutch as defined in claim 7 in which the spaced apart parallel conductors in each of the surfaces of the second rotor are uniformly spaced apart and are fixed parallel to the axis of rotation of the second rotor.

9. An induction clutch as defined in claim 8 in which the surface of the first rotor next the second rotor is fitted with windings for direct current adapted to establish a predetermined number of alternate north and south poles.

10. An induction clutch as defined in claim 9 in which the whole number N is two.

11. An induction clutch as defined in claim 1 comprising, a squirrel cage winding fitted into the surface of the stator next the second rotor, and in which the whole number N is three.

12. An induction clutch as defined in claim 11 in which the spaced apart parallel conductors in each of the surfaces of the second rotor are uniformly spaced apart and are fixed parallel to the axis of rotation of the second rotor.

13. An induction clutch as defined in claim 12 in which the surface of the first rotor next the second rotor is fitted with windings for direct current adapted to establish a predetermined number of alternate north and south poles.

14. An induction clutch for transmitting rotative power between two shafts comprising, a cylindrical shaped stator, a first cylindrical shaped rotor coaxially arranged with respect to the stator and fixed to one of said shafts to rotate therewith, a second cylindrical shaped rotor coaxially arranged with respect to the stator and fixed to the other of said shafts to rotate therewith, the second rotor being between the stator and the first rotor, the surface of the second rotor next the first rotor being fitted with windings for direct current adapted to establish a predetermined number of alternate north and south magnetic poles, the surface of the first rotor next the second rotor being fitted with a squirrel cage winding, each of the surfaces of the second rotor next the stator and next the first rotor being fitted with spaced apart parallel conductors, the number of said conductors in the surface of the second rotor next the stator being N times the number of said conductors in the surface of the second rotor next the first rotor, where N is a whole number, the surface of the stator next the second rotor being fitted with a squirrel cage winding and with windings for direct current adapted to establish N times as many alternate north and south magnetic poles as on the surface of the second rotor next the first rotor, interconnections at each end of the second rotor from N conductors of like phase in the surface of the second rotor next the stator to each of the conductors in the surface of the second rotor next the first rotor, said interconnections at one end of the second rotor being crossed with respect to said interconnections at the other end, and means operable to short circuit the said interconnections at either end of the second rotor.

15. An induction clutch as defined in claim 14 in which the spaced apart parallel conductors in each of the surfaces of the second rotor are uniformly spaced apart and are fixed parallel to the axis of rotation of the second rotor.

16. An induction clutch as defined in claim 15 in which the surface of the first rotor next to the second rotor is fitted with windings for direct current adapted to establish a predetermined number of alternate north and south poles.

17. An induction clutch as defined in claim 16 in which the whole number N is two.

18. An induction clutch as defined in claim 14 in which the whole number N is two.

No references cited.